March 31, 1964
P. L. CROWCROFT
3,127,571
APPARATUS FOR PRODUCING FREQUENCY CHANGES BY
OPPOSITELY VARYING TWO INDUCTORS
Filed May 25, 1959
2 Sheets-Sheet 1
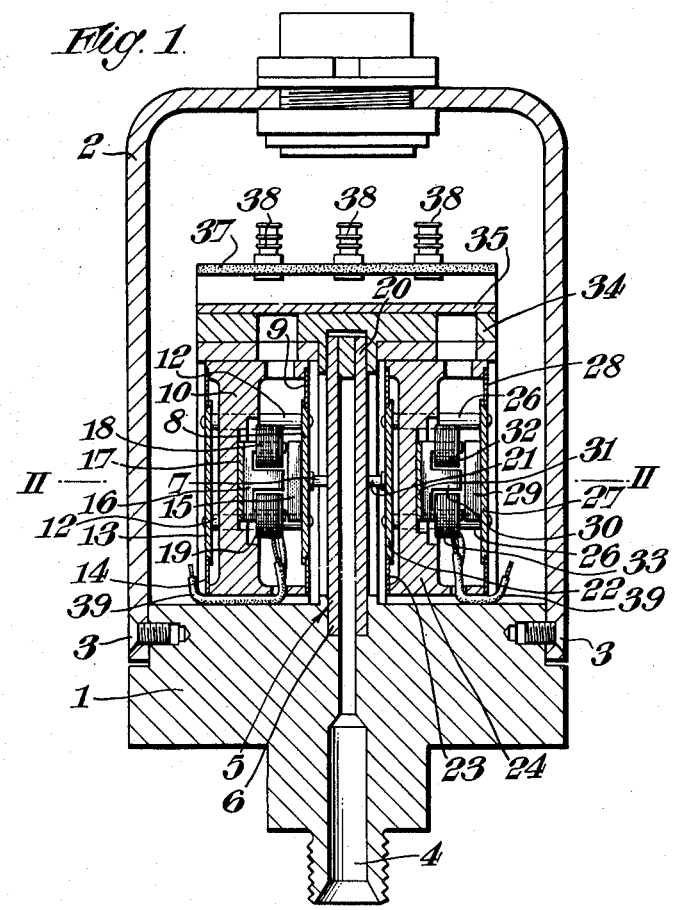
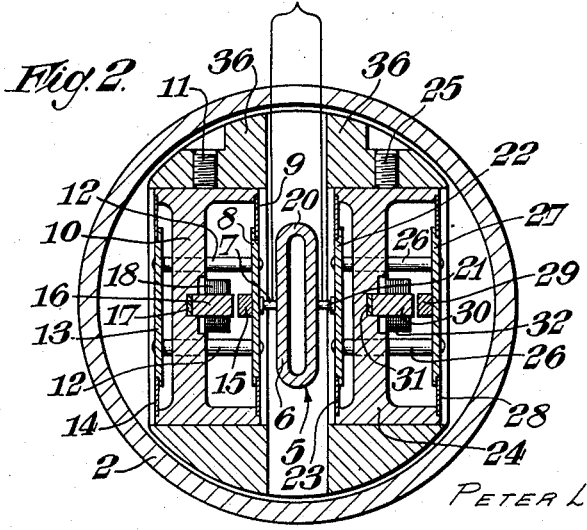
INVENTOR
PETER LESTER CROWCROFT
BY Cushman, Darby & Cushman
ATTORNEYS

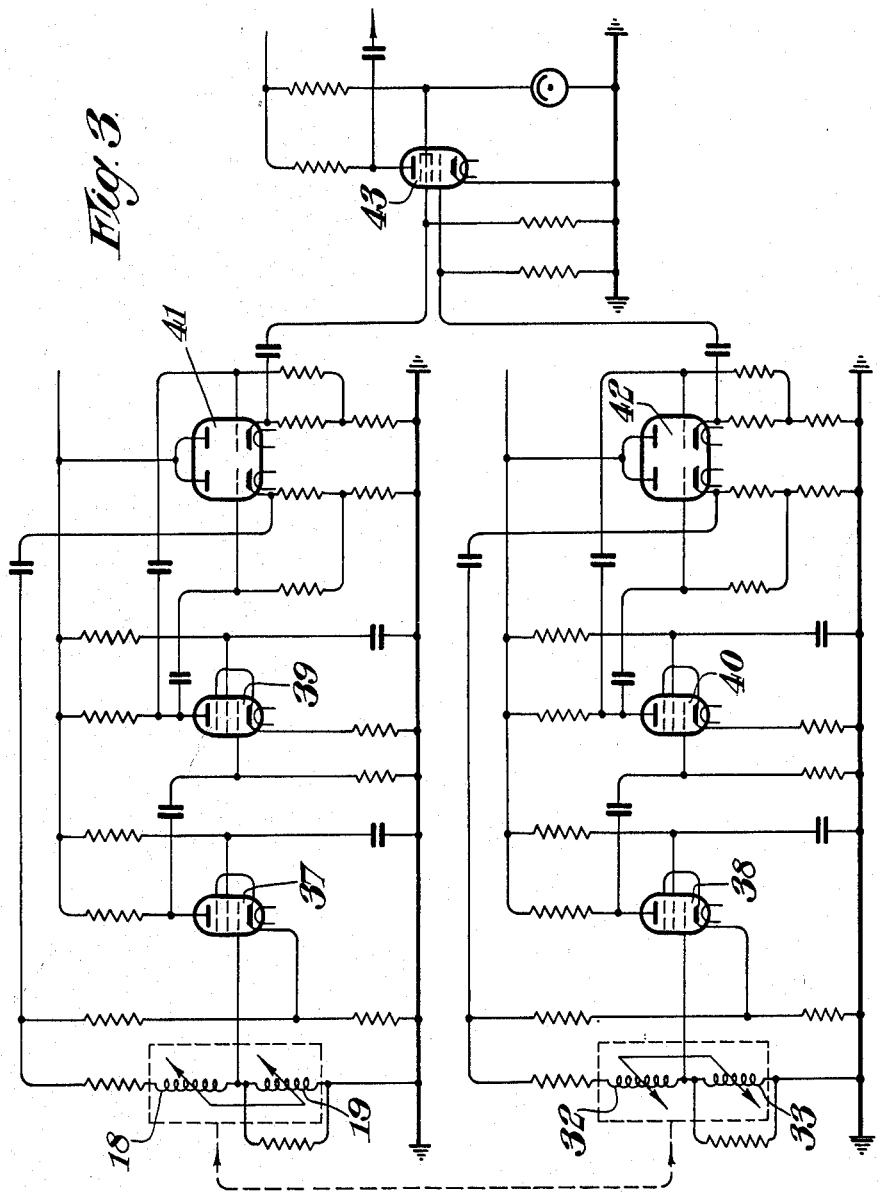

1

3,127,571
APPARATUS FOR PRODUCING FREQUENCY CHANGES BY OPPOSITELY VARYING TWO INDUCTORS
Peter Lester Crowcroft, Franche, Kidderminster, England, assignor to Imperial Chemical Industries Limited, London, England, a British company
Filed May 25, 1959, Ser. No. 815,491
Claims priority, application Great Britain June 13, 1958
4 Claims. (Cl. 331—40)

This invention is concerned with apparatus which is capable of producing electrical frequency analogues of physical variables.

It is frequently desirable to produce electrical frequency analogues of physical variables to facilitate the interpretation of intelligence, and the need arises, to quoe one example, when it is necessary to integrate pressure/time values during the testing of a rocket motor.

The invention provides an apparatus for converting a linear displacement into an electrical frequency bearing a linear relation to said displacement, comprising a pair of oscillators having the same natural frequency, means responsive to an applied linear displacement for modulating the frequency of the oscillators in opposite senses and each to an extent proportional to the displacement, a device for mixing the resultant modulated frequencies, and an indicator and/or a recording device connected to the output of the mixing device.

The apparatus according to the invention thus converts a displacement into a frequency (the displacement/frequency relationship being linear) by modulating the frequencies of two oscillators, having the same natural frequency of operation, in opposite directions in accordance with the displacement, and then beating the two modulated frequencies together, thereby producing a difference frequency which is proportional to the sums of the modulations. The time integral of frequency thus obtained, which corresponds to the time integral of the displacement, is then fed to a suitable indicating apparatus and/or recording apparatus.

Preferably the modulating means includes a pair of inductance transducers included respectively in the feed back paths of the two oscillators, the transducers normally having different air gaps, and mechanism responsive to the displacement to be measured for adjusting the two air gaps in opposite senses and each to an extent proportional to the displacement.

FIGURES 1 and 2 of the drawings show a transducer mechanism in accordance with the invention, FIGURE 1 being a sectional elevation and FIGURE 2 being a sectional view taken along the line II—II of FIGURE 1. This transducer mechanism, which is shown merely by way of example of the invention, is suitable for use where frequency analogues of pressure are required.

FIGURE 3 of the drawings shows a suitable circuit arrangement for use with the transducer mechanism shown in FIGURES 1 and 2.

Referring to FIGURES 1 and 2 of the drawings, the transducer mechanism comprises a base portion 1 and a cover 2 secured to the base portion by screws 3. A bore 4 formed substantially centrally in the base portion 1 communicates with a sensing means which includes, as illustrated in this preferred embodiment, a flattened pressure tube 5 having one transverse dimension much longer than the other as shown in FIGURE 2.

One side, 6, of the tube 5 is connected by means of a push rod 7, which is formed from metal with a temperature coefficient of expansion greater than that of steel, to a movable circular plate 8. The edge portion of the plate 8 is carried by an apertured diaphragm 9 which is supported by an annular housing 10. The housing 10 is secured in place by set screws one of which, 11, is shown in FIGURE 2. Four distance pieces, 12, connect the circular plate 8 to a similar circular plate 13 which is carried by an apertured diaphragm 14 supported at the other side of the annular housing 10, the distance pieces passing through suitable holes in the annular housing. An I-shaped core, 15, of magnetic material (conveniently a ferrite material) is secured to the circular plate 8 in the region of its centre, and an E-shaped core 16, of similar magnetic material and a spacer 13 are fixed to the annular housing 10. The E-shaped core 16 is opposite to the I-shaped core 15 and they are separated from each other by a small air-gap. A coil 18 is wound on one outer limb of the E-shaped core 16 and a similar coil 19 is wound on the other outer limb of the E-shaped core 16. This arrangement of the cores, coils, and the air gap comprises a magnetic circuit.

The other side 20 of the tube 5 is connected by means of a push rod 21, which is formed from metal having a temperature coefficient of expansion less than that of steel, to a movable circular plate 22. The edge portion of the plate 22 is carried by an apertured diaphragm 23 which is supported by an annular housing 24. The housing 24 is secured in place by set screws one of which, 25, is shown in FIGURE 2. Four distance pieces 26 connect the circular plate 22 to a similar movable circular plate 27 which is carried by an apertured diaphragm 28 supported at the other side of the annular housing 24, the distance pieces passing through suitable holes in the housing. An I-shaped core, 29, of magnetic material (conveniently a ferrite material) is secured to the movable plate 27 in the region of its centre, and an E-shaped core, 30, of similar magnetic material and a spacer 31 are fixed to the annular housing 24. The E-shaped core 30 is opposite to the I-shaped core 29 and they are separated from each other by a small air-gap. A coil 32 is wound on one outer limb of the E-shaped core 30 and a similar coil 33 is wound on the other outer limb of the E-shaped core 30. This arrangement of the cores, coils, and the air gap comprises another magnetic circuit.

An end plate 34 and a mounting plate 35 hold the assembly just described in position in association with side plates 36 through which the set screws 11, 25, pass.

A tag board 37 is mounted above the mounting plate 35 and has terminals 38 in which the leads 39 from the coils 18, 19, 32 and 33 are connected.

The coils 18, 19, 32 and 33 are similar, the coils 18 and 19 forming part of a Wien-Dolezalek bridge circuit which is included in the feed back path of a first oscillatory circuit, and the coils 32 and 33 forming part of a second Wien-Dolezalek bridge circuit which is included in the feed back part of a second oscillatory circuit. The Wien-Dolezalek bridge circuit is described in "A.C. Bridge Methods," by Hague, at page 322, and comprises two inductance coils, one of which is connected in series with a resistor and the other of which is connected in shunt with a further resistor to form a frequency-dependent network having a reciprocal relationship between inductance and frequency. The oscillators work in anti-phase modulation to provide a suitably compensated system.

The two oscillatory circuits are shown in FIGURE 3 and each comprises an E.F. 86 valve (37 or 38), an E.F. 91 valve (39 or 40) and a 12AX7 valve (41 or 42) with associated circuitry. The oscillators have a frequency of oscillation of 8 kilocycles per second. The outputs from the oscillatory circuits are fed to a mixer circuit employing a 6 B.E. 6 valve, 43, and the output from this valve is fed through a suitable filter circuit to a suitable indicator and/or recording device (not shown).

When the interior of the pressure tube 5 is subjected to atmospheric pressure, the air-gap between the cores 15 and 16 is greater than the air-gap between the cores 29 and 30 by approximately the movement due to full scale deflection. The number of turns of the coils are adjusted so that each coil has the same inductance in spite of the difference in air-gap. Each bridge is adjusted by the resistive network to balance and zero phase shift when 8 kilocycles per second is supplied to the bridge. When the bridge is connected to the amplifier the system will oscillate at 8 kilocycles per second with the bridge slightly off balance. When each oscillator is at 8 kilocycles per second the mixer output is zero.

When a pressure above atmospheric pressure is applied to the interior of the pressure tube 5, the walls 6 and 20 move away from each other, the air-gap between the cores 15 and 16 is decreased and the air-gap between the cores 29 and 30 is increased, the amount by which one is increased being equal to the amount by which the other is decreased. The conditions of balance in the two bridge circuits are thus changed by equal amounts but in opposite directions, resulting in a decrease in the frequency of oscillation of the oscillator including coils 18 and 19 and an increase in the frequency of oscillation of the oscillator including coils 32 and 33. The beat frequency output from the mixer circuit is thus equal to the difference frequency and is the required analogue of the pressure.

The coefficients of expansion of the push rods 7 and 21 are such that the variations in the inductances of the coils arising from changes in temperature are equal and compensation is provided.

The analogues obtained may be converted to pulses and, when counted over a period of time, produce a time integral of frequency and thus of the variable, e.g. pressure. The integral produced over a short period of time, say 0.01 seconds, approximates to a digital value of pressure if the time is accurately defined. This digital value of pressure may be recorded on magnetic tape and played back into a decoder and stored on punched cards, punched tape or the like, from which a computer could produce further data, such as peak pressures.

The apparatus just described with reference to the drawings, which employs a dual inductance transducer system, has the following advantages over arrangements which have hitherto employed a single inductance transducer system:

(1) *Compensation of H.T. and L.T. changes.*—This takes place naturally due to the use of a dual inductance system.

(2) *Acceleration and vibration compensation.*—The particular construction using as it does an elliptical pressure tube provides displacements in opposite directions and therefore compensates acceleration effects.

(3) *Temperature compensation of the transducer.*—Inductance transducers are not normally chosen because of their poor temperature coefficient. The internal balancing of zero beat due to equal temperature effects on both pairs of inductances is an important factor. Changes in the carrier frequencies with temperature produce an effect on the sensitivity proportional to the percentage modulation. The effect is mainly due to the temperature coefficient of permeability of the ferrite, and is compensated by the use of link rods to each I core of different coefficient expansion.

(4) *Temperature compensation of the oscillator.*—Any change in the components of the amplifier due to temperature, will be balanced by the use of two oscillators.

(5) *Linearity.*—Linearity of each oscillator is good due to the matching of the reciprocal law of the inductance to the reciprocal law of the oscillator. The final linearity is due to the push-pull nature of the transducers causing adding of linear terms and cancellation of second order and higher terms.

(6) *Sensitivity can be set independently of zero.*—This is achieved by a two gang control simultaneously altering both carriers and is possible because the system uses identical oscillators.

What I claim as my invention and desire to secure by Letters Patent is:

1. Apparatus for sensing a physical displacement and producing an electrical signal the frequency of which bears a linear relation to the said displacement, comprising in combination a pair of inductance transducers, each transducer including coil means and a magnetic circuit linking said coil means and having an air gap therein; sensing means operatively connected to said pair of transducers and responsive to an applied displacement to adjust the air gaps of each magnetic circuit in opposite senses to an extent proportionate to the displacement to produce an inductance change in one of said transducers which is inversely proportional to a decrease in the air gap of its associated magnetic circuit resulting from the adjustment and to produce an inductance change in the other of said transducers which is inversely proportional to an increase in the air gap of its associated magnetic circuit resulting from the adjustment; a circuit connected to each coil means to form therewith separate oscillators the frequencies of which are modulated in inverse proportion to the inductance changes of their associated transducers, means for mixing the modulated frequencies of the oscillators to produce a beat frequency output which is linearly related to said displacement.

2. Apparatus according to claim 1, wherein said coil means of each transducer comprises two inductance coils, a first resistor connected in series with one of said coils, and a second resistor connected in shunt with the other of said coils, the series connected coil and the shunted coil being connected in a feedback path of its respective oscillator to form a frequency-dependent network having a reciprocal relationship between inductance and frequency.

3. Apparatus according to claim 1, wherein the sensing means adjusting the air gaps of each magnetic circuit includes means for providing equal variations in the inductances of the transducers in the same sense in response to changes in temperature.

4. Apparatus according to claim 1, in which the sensing means for adjusting the air gaps includes a flattened pressure tube having push rods connected to its opposite walls, and wherein the mixing means produces an output beat frequency proportional to the pressure within the tube.

References Cited in the file of this patent

UNITED STATES PATENTS

| | | |
|---|---|---|
| 2,240,452 | Wolfskill | Apr. 29, 1941 |
| 2,266,608 | Kuehni | Dec. 16, 1941 |
| 2,696,602 | Evans | Dec. 7, 1954 |
| 2,847,625 | Popowsky | Aug. 12, 1958 |
| 2,968,943 | Statham | Jan. 24, 1961 |